United States Patent [19]

Pendleton

[11] 4,384,442

[45] May 24, 1983

[54] APPARATUS FOR MAKING CUSHIONING PACKAGING MATERIAL

[76] Inventor: John M. Pendleton, 3038 Five Mile Rd., Racine, Wis. 53402

[21] Appl. No.: 77,594

[22] Filed: Sep. 21, 1979

Related U.S. Application Data

[63] Continuation-in-part of Ser. No. 900,807, Apr. 27, 1978.

[51] Int. Cl.³ .............................................. B65B 9/12
[52] U.S. Cl. .................................................... 53/554
[58] Field of Search ................ 53/550, 551, 552, 553, 53/554, 511, 79, 472, 373; 156/145, 147, 582, 583

[56] References Cited

U.S. PATENT DOCUMENTS

| | | | |
|---|---|---|---|
| 2,749,691 | 6/1956 | Lewis | 53/554 |
| 2,919,990 | 1/1960 | Podlesak et al. | 53/511 X |
| 2,999,532 | 9/1961 | Bursak | 53/552 X |
| 3,321,353 | 5/1967 | Zelnick | 53/373 |
| 3,438,173 | 4/1969 | Omori | 53/552 X |
| 3,667,593 | 6/1972 | Pendleton | 53/472 |
| 4,004,399 | 1/1977 | Borrello | 53/554 |
| 4,102,111 | 7/1978 | Nack et al. | 53/373 X |

Primary Examiner—Horace M. Culver

[57] ABSTRACT

Apparatus for making cushioning material for packaging materials is disclosed and includes means for driving webs of heat sealable material in face-to-face relationship, distending the webs by a stream of air or the like, transversely sealing and severing the distended webs to provide discrete capsules which are yieldable and capable of cushioning objects of commerce.

1 Claim, 6 Drawing Figures

APPARATUS FOR MAKING CUSHIONING PACKAGING MATERIAL

This application is a continuation-in-part of application Ser. No. 900,807 filed Apr. 27, 1978.

BACKGROUND OF THE INVENTION

The structure according to the present invention is an improvement over apparatus for making flowable dunnage material as exemplified in Pendleton U.S. Pat. Nos. 3,389,534, 3,484,325, 3,667,593.

SUMMARY OF THE INVENTION

The apparatus as disclosed herein makes it possible to form such dunnage material in a continuous operation rather than in an intermittent step-by-step fashion, and make such dunnage material from webs of heat sealable resinous material or from webs composed of cellulosic materials having a heat sealable resinous coating thereon. Examples of such resinous material are polyethylene, polypropylene, ethylvinyl acetate. Such material is in the form of a web which may be in the form of webs of the same or in the form of coatings applied to a web of cellulosic substrate material.

In forming capsules of the dunnage material, closely controlled application of heat for sealing must be had, particularly in the use of resinous materials readily passing from a solid state to a gaseous one, polyethylene being an example of such resin.

According to the invention herein, careful control of the sealing and severing heat is achieved by conjugately arranged cusped roll structures engaging distended webs and transversely sealing and severing the webs into discrete dunnage capsules. One of the roll structures is a cusped anvil roller and the other is a heating and severing roller. The latter has closely spaced transversely extending sealing shoes separated by a heated severing element therebetween. The form of severing element is governed by the type of web material employed.

THE DRAWINGS

Figure 1:
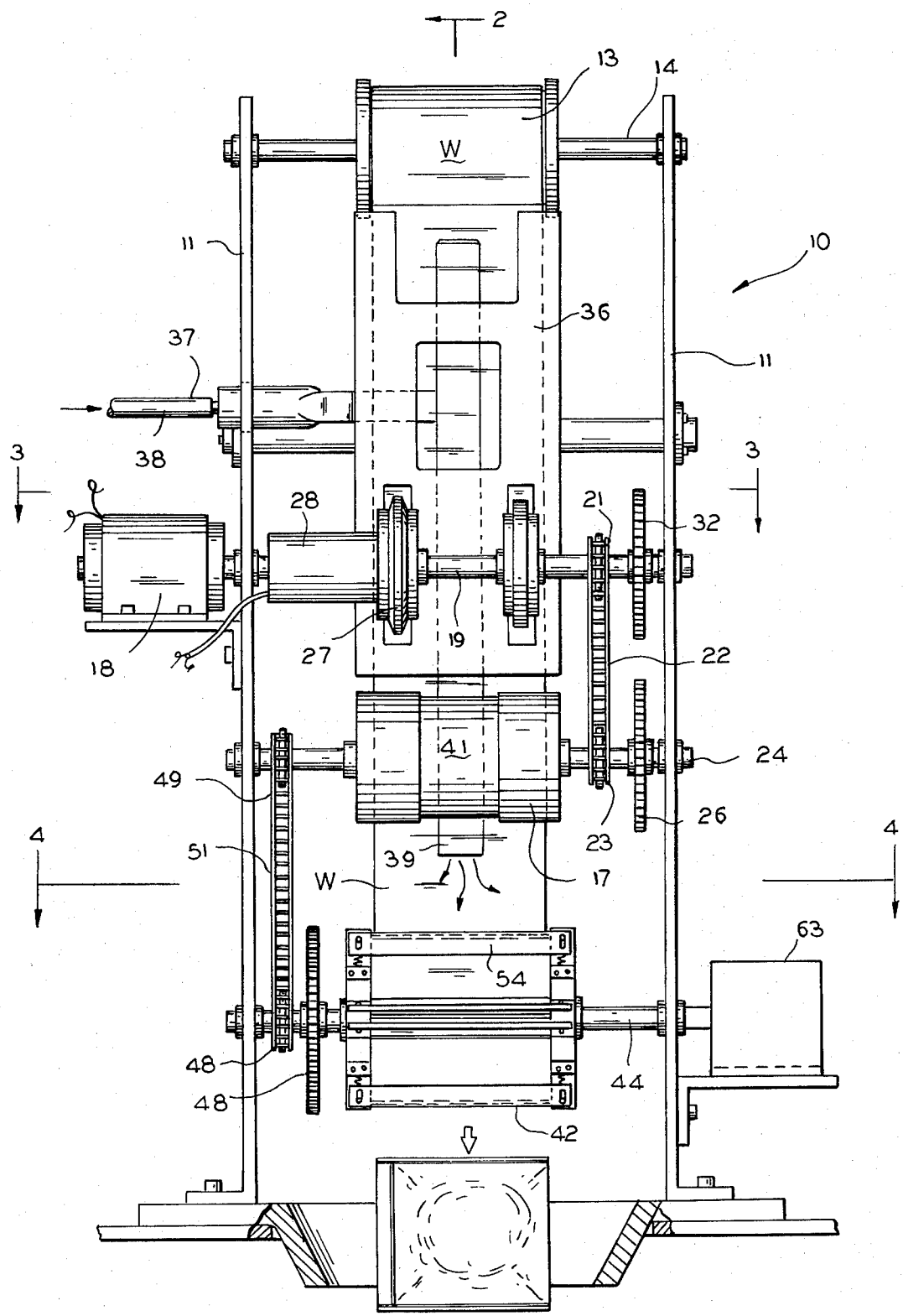
FIG. 1 is an elevational view showing the apparatus according to the present invention.

The improved apparatus according to the invention is denoted generally by the reference numeral 10 and includes a pair of laterally spaced main frames 11 arranged to support a reel 12 supplying a web W trained over an idler roll 13 free to turn on a shaft 14 extending between the spaced frames 11.

Web W may be folded upon itself to provide a pair of joined side-by-side confronting web elements, or in the alternative a pair of such web elements not so joined.

The web W moves past a tension device 16 to maintain proper tension thereon as it is drawn past the idler roll 13.

The web W is moved by feed rollers 17,17 driven from a motor 18 having an output shaft 19 supported in the frames 11. A sprocket 21 fast on shaft 19 and having a sprocket chain 22 trained thereon drives a sprocket 23. A shaft 24 has the sprocket 23 fast thereon and a gear 26 also fast thereon meshing with a like gear on a like shaft drives feed rollers 17.

The moving web W is sealed along the free edge thereof if web W is folded on itself or along a pair of edges if web W is in the form of a pair of confronting webs.

The shaft 19 thus has at least one heat sealing roller 27 fast thereon if a folded W is employed, and roller 27 is heated by controlled heating element 28. Roller 27 is arranged to turn with an anvil roller 29 fast on a shaft 31, shafts 19 and 31 being driven by a pair of mating gears 32.

In the case where web W is in the form of a pair of confronting webs an additional heat sealing roller 33 is provided, it turning with an anvil roller 34.

If web W is folded upon itself rollers 33 and 34 are instrumental in guiding the web W and in such an event roller 33 is not heated.

The web W is guided into the nip of the rolls 27, 29, 33 and 34 by closely spaced confronting guide plates 36,36 and structure is provided for distending the longitudinally sealed webs to provide an elongated tube which subsequently can be transversely sealed and severed to provide discrete capsules of flowable dunnage material.

A tube 37 is connected to an air supply 38, and in turn is connected to a flattened tube 39 extending between the confronting web elements W and terminating below the rollers 17. Rollers 17 have relieved center portions 41 to accommodate the entrance therebetween of flattened tube 39.

Structure is provided for transversely sealing and severing the tube of distended sides thus formed, and such structure consists of a cusped sealing and severing roller 42 and a cusped anvil roller 43 respectively fast on shafts 44 and 46 journaled at their ends in the spaced frames 11.

Each of the shafts 44 and 46 has a mating gear 47 thereon, and shaft 44 is driven by a sprocket 48 driven from shaft 24 by a sprocket 49 and sprocket chain 51.

Figure 5:
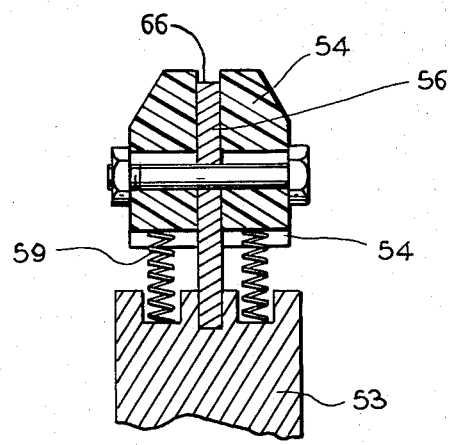
FIG. 5 is a sectional view looking in the direction of the arrows 5—5 of FIG. 4.
Figure 6:
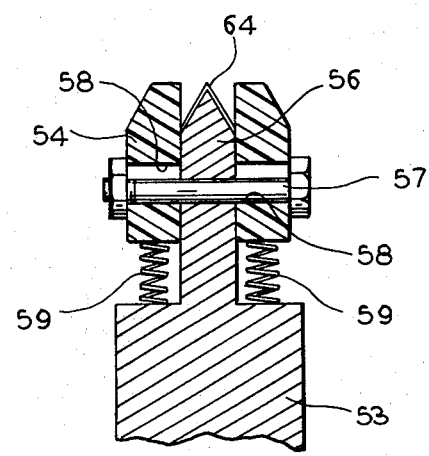
FIG. 6 is a view similar to FIG. 5 showing another form of sealing and severing structure.

Details of transverse sealing and severing roller 42 are shown in FIGS. 5 and 6, but it may be noted that roller 42 has a hub 52 with spider arms 53 extending therefrom. Each of the arms 53 supports spaced transversely extending sealing shoes 54 made of thermosetting resinous material. Shoes 54 flank a transversely extending severing element 56 which may be secured to arm 53 in any convenient manner.

A pin 57 passes through severing element 56 and through slots 58 in shoes 54. Springs 59 held between spider arm 53 and shoes 54 enable the shoes to move against the bias of springs 59.

Sealing and severing roller 42 moves in timed relationship to the anvil roller 43 which has spider arms 61 supporting at the ends thereof a resilient anvil strip 62 which cooperates with the severing element 56.

Structure is provided for supplying heat to the spider arms 53 and in turn to severing and sealing elements 54 and 56 and includes a thermostatically controlled heating element 63, the heating effect being conducted through shaft 44 and arms 53.

The severing element 56 shown in FIG. 6 is indicated for use where cellulosic webs coated with heat sealable resinous material is employed. Severing element 56 accordingly has a knife edge 64 which cooperates with the anvil strips 62 to sever the transversely sealed and distended webs W.

The severing element 56 seen in FIG. 5 has a flat severing face 66. This construction is indicated where the webs are not formed of cellulosic material with thermoplastic heat sealable flow. In cases where the webs W are of polyethylene or polypropylene the heating effect of the severing element must be highly intense and localized so that the thermoplastic can pass from the solid state to a gaseous one.

In the forms of the severing elements 56 seen in FIGS. 5 and 6, in each case they are flanked by the shoes 54 which create sealed areas to each side of the transverse severed areas in webs W. Shoes 54 do not have the intensive heat therein as do the severing elements 64 and 66.

Figure 2:
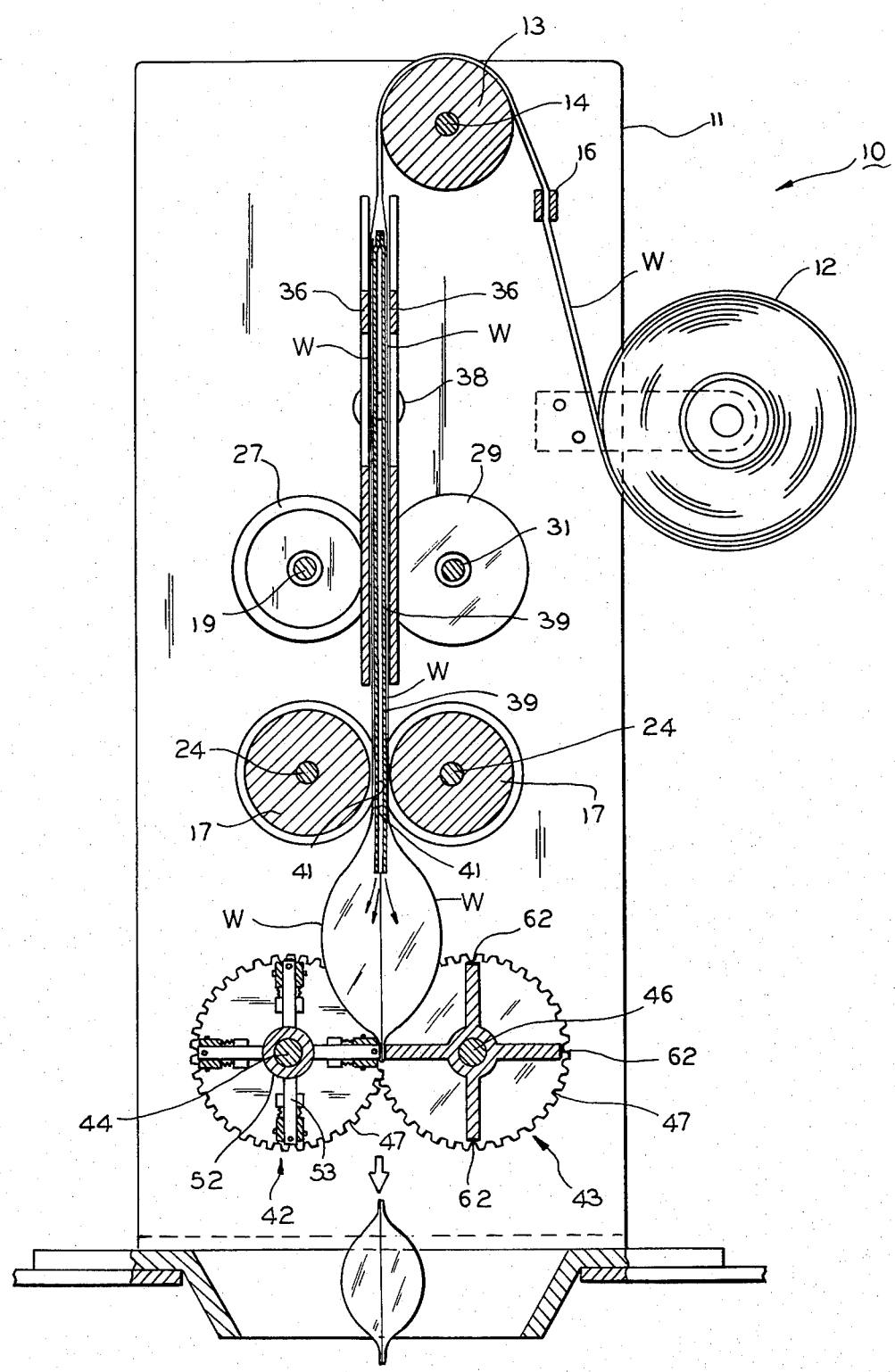
FIG. 2 is a longitudinal section taken along the line 2—2 of FIG. 1 looking in the direction of the arrows.
Figure 3:
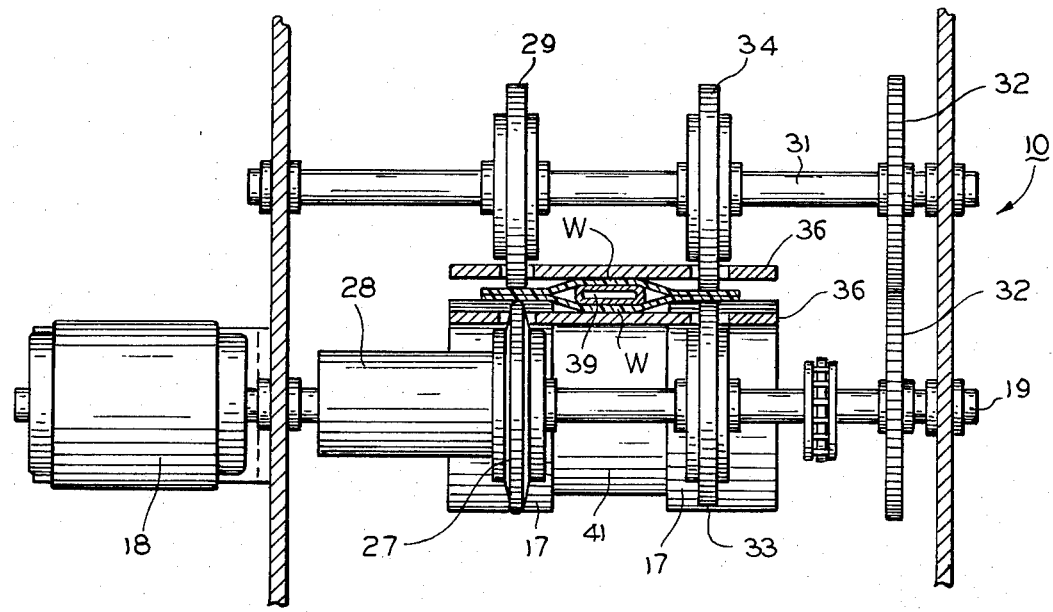
FIG. 3 is a plan view looking in the direction of the arrows 3—3 of FIG. 1.
Figure 4:
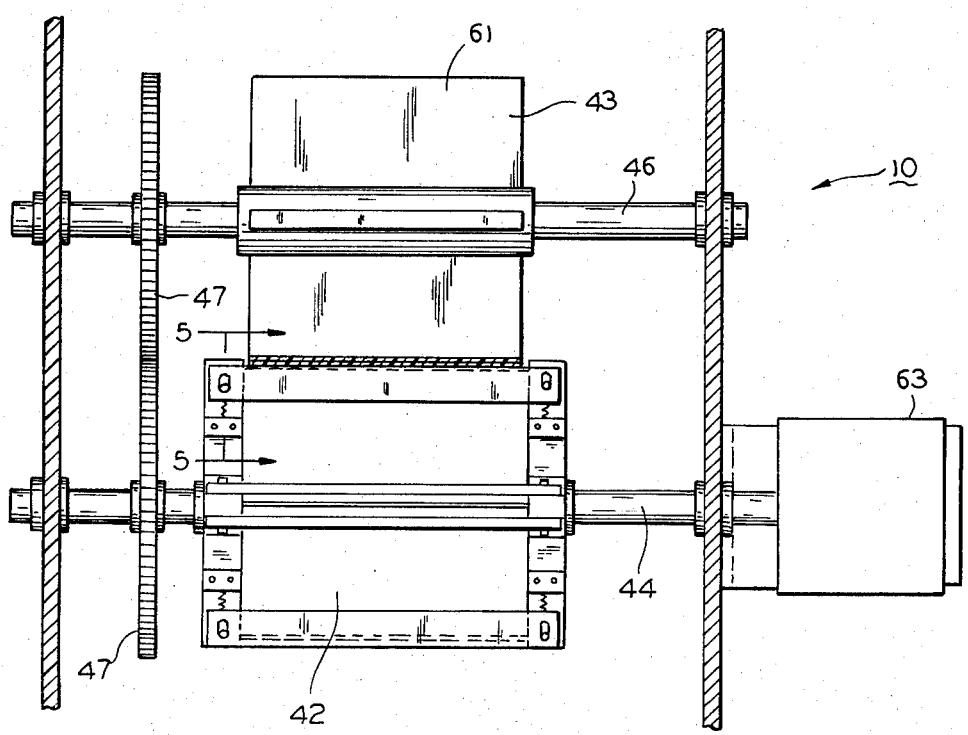
FIG. 4 is a plan view looking in the direction of the arrows 4'4 of FIG. 1.

The elements 54 arranged to engage the distended tube seen in FIGS. 3 and 2 nip the walls thereof to prevent the escape of occluded air therein. The continued rotation of the severing roller 42 and anvil roller 43 causes the end of the capsule formed by the nip of elements 54 with anvil strip 62 causes the web W with the occluded air therein to be subject now to completion of both sealing and severing operations.

As has been pointed out, elements 54 are heated sufficiently to soften the resinous material sufficient to seal the web W thereof sufficiently to weld same together. Severing of a discrete capsule from another is achieved by the severing elements 64 or 66 lying between the shoes 54 flanking the same.

I claim:

1. In apparatus for making cushioning packaging material, such material being in the form of discrete capsules formed from a pair of webs of heat sealable flexible sheet material joined in facing relationship with the webs distended and transversely sealed and severed transversely thereof to provide discrete cushioning capsules:
   (a) a frame including drive means for moving web material having web elements in face-to-face relationship;
   (b) means for sealing the movable strip along at least one edge thereof to provide an elongated tubular strip;
   (c) means for directing a stream of gaseous material within the so formed tubular strip to distend the sides thereof;
   (d) means for sealing and severing the distended strip transversely thereof while the distended strip is moving, said means comprising:
   (e) a pair of conjugately arranged cusped roll structures arranged to engage said distended strip therebetween;
   (f) one of said roll structures being an anvil roller and the other being a heating and severing roller;
   (g) said heating and severing roller having sealing devices mounted along the periphery thereof in spaced relationship;
   (h) each of said sealing devices having a pair of closely spaced resiliently supported transversely extending sealing shoes mounted thereon with a transversely extending heated severing element therebetween;
   (i) said sealing shoes engaging said distended tube transversely and nipping the same between said sealing shoes to encapsulate the gaseous material in said distended web and seal the same transversely thereof, and said heated severing element separating said tube between said nipped and sealed portions of said tube to provide a discrete cushioning capsule.

* * * * *